United States Patent [19]

Hokanson et al.

[11] Patent Number: 4,556,067

[45] Date of Patent: Dec. 3, 1985

[54] BANDWIDTH INDICATOR FOR DOPPLER BLOOD FLOWMETERS

[75] Inventors: D. Eugene Hokanson, Mercer Island; Dennis C. Arneson, Renton, both of Wash.

[73] Assignee: D. E. Hokanson, Inc., Issaquah, Wash.

[21] Appl. No.: 569,681

[22] Filed: Jan. 10, 1984

[51] Int. Cl.⁴ ............................................. A61B 10/00
[52] U.S. Cl. ................................. 128/663; 73/861.25; 324/77 B; 364/485
[58] Field of Search ............... 128/660, 663; 73/602, 73/861.25; 324/77 B; 364/572, 484, 485, 724, 516–517

[56] References Cited

U.S. PATENT DOCUMENTS

| | | | |
|---|---|---|---|
| 3,430,625 | 3/1969 | McLeod, Jr. | 128/663 |
| 3,498,290 | 3/1970 | Shaw et al. | 128/663 |
| 3,710,792 | 1/1973 | Light | 128/663 |
| 3,715,509 | 2/1973 | Dawson | 364/485 |
| 3,732,532 | 5/1973 | Flaherty et al. | 73/861.25 |
| 3,896,788 | 7/1975 | Sato | 128/663 |
| 3,901,077 | 8/1975 | McCarty et al. | 73/861.25 |
| 3,922,911 | 12/1975 | Groves et al. | 73/861.25 |
| 3,996,925 | 12/1976 | Djordjevich | 128/693 |
| 4,084,245 | 4/1978 | Bunge | 364/485 |
| 4,093,989 | 6/1978 | Flink et al. | 364/485 |
| 4,103,679 | 8/1978 | Aronson | 128/663 |
| 4,217,909 | 8/1980 | Papadofrangakis et al. | 128/663 |
| 4,257,278 | 3/1981 | Papadofrangakis et al. | 73/861.25 |
| 4,265,126 | 5/1981 | Papadofrangakis et al. | 73/861.25 |
| 4,363,099 | 12/1982 | Srinivasan et al. | 364/484 |

Primary Examiner—Kyle L. Howell
Assistant Examiner—Ruth S. Smith
Attorney, Agent, or Firm—Ward Brown; Robert W. Beach

[57] ABSTRACT

The analog broadband output signal of a medical Doppler device is sampled at a constant rate to convert the signal to digital form. The sample values are stored consecutively in a random access memory component. Such values are recalled from such component at a readout rate different from the sampling rate so as to create a frequency-shifted intermediate broadband signal corresponding to the Doppler output signal. Such intermediate signal is filtered and the power of the filtered intermediate signal is continuously compared to the power of the unfiltered intermediate signal. The readout rate from the memory component is adjusted to maintain approximately the same proportionate relationship of the power of the filtered intermediate signal to the power of the unfiltered intermediate signal. The continuously adjusted readout rate from the memory component indicates a "band edge" frequency above or below which a preselected proportion of the total power of the Doppler signal resides.

20 Claims, 17 Drawing Figures

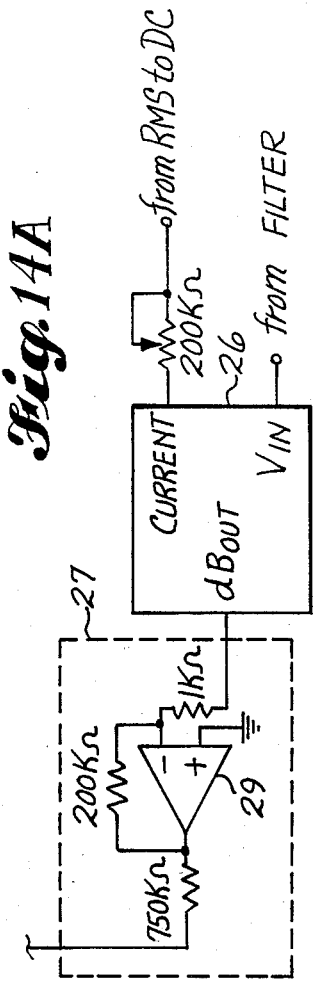
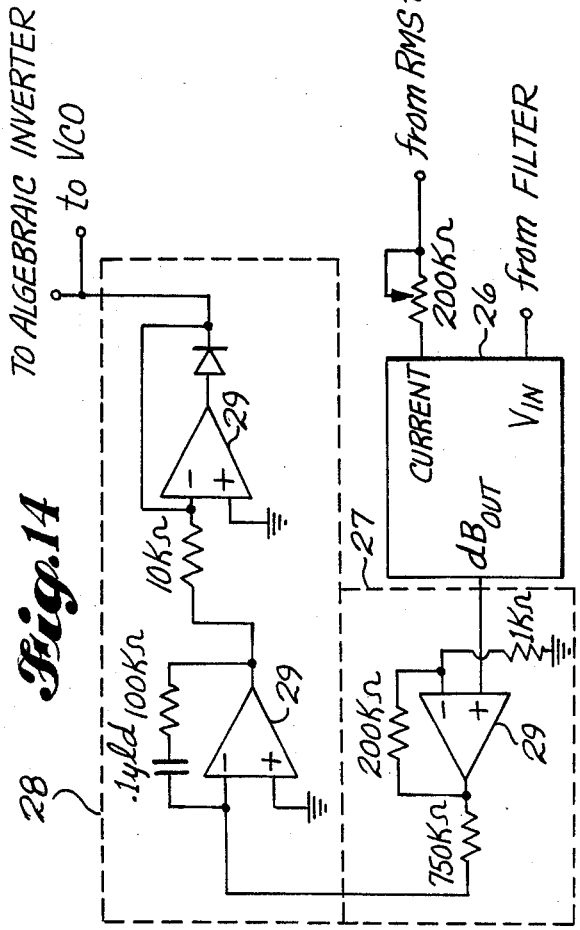
Fig. 14A
Fig. 14
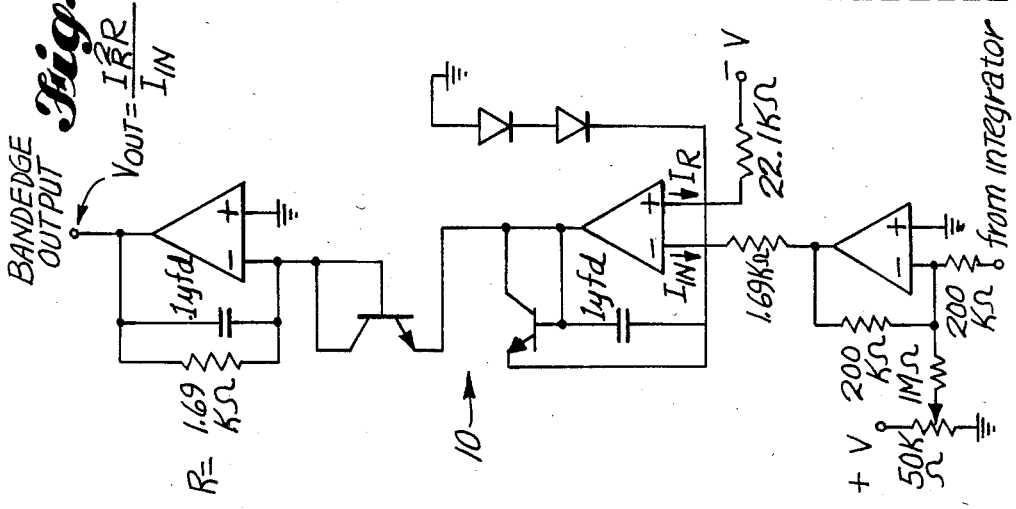
Fig. 15
$V_{OUT} = \dfrac{I_R R}{I_{IN}}$

BANDWIDTH INDICATOR FOR DOPPLER BLOOD FLOWMETERS

BACKGROUND OF THE INVENTION

1. Field of the Invention

The present invention relates to a device and method for indicating substantially instantaneously the bandwidth of an electrical signal having several frequency components, that is a "broadband" electrical signal, and particularly to such a device and method for indicating the bandwidth of the output of a medical Doppler device.

2. Prior Art

Medical Doppler devices are used to detect the velocity and volume of blood flowing through a blood vessel. In general, ultrasound waves of a known frequency are beamed into the body by a transmitting transducer held stationary relative to the blood vessel. A receiving transducer stationary relative to the transmitting transducer detects the waves reflected from blood moving through the blood vessel. The difference in frequency of a wave before and after its reflection indicates the velocity of the blood from which the wave was reflected. The medical Doppler device generates a broadband, audio frequency, electrical output signal; and the relative amplitude of each frequency component of such output signal indicates the proportion of blood flowing at the corresponding velocity.

Signal-analyzing devices are known which display the audio frequency output signal as a trace on a cathoderay tube. Such a device can indicate the average blood velocity over time. Comparison of the Doppler output signal before and after a heartbeat as represented by the trace may suggest the condition of the heart or the condition of the blood vessel, or the transducers can be moved incrementally along a blood vessel extending generally parallel to the surface of the body to detect or locate a partial blockage.

More sophisticated signal-analyzing devices known as spectrum analyzers use digital and Fourier transform techniques to detect the individual frequency components of the Doppler output and to calculate the relative amplitudes of such components. Various types of displays can be generated to indicate the distribution of Doppler output frequencies, which corresponds to the distribution of blood velocities. For example, a video display can show a narrow or broad band pattern indicating the range of frequency components detected over time. A desired time in the heart cycle can be selected by a cursor, and a second display resembling a bar graph or histogram can indicate the amplitude of each frequency component at the selected time.

Turbulent flow through the blood vessel can be indicated by a wide range of velocities at a given point in time which, in turn, is indicated by a Doppler output of a wide frequency range. One measure of the frequency range is the "bandwidth" which has been defined as the difference between the upper and lower half-power frequencies. For turbulent flow, however, not only is a broad range of frequencies present in the Doppler output but also the amplitudes of the various frequency components can vary irregularly and may not be symmetrical with respect to any mid or maximum power frequency. Half-power bandwidth may not give a reliable, diagnostically valuable indication of the frequency distribution because Doppler output signals having quite different frequency distributions may, nevertheless, have about the same half-power bandwidth.

Medical Doppler devices and/or signal-analyzing devices described as being for use with medical Doppler devices are described in the following U.S. patents:

McLeod, Jr. U.S. Pat. No. 3,430,625;
Shaw et al. U.S. Pat. No. 3,498,290;
Light U.S. Pat. No. 3,710,792;
Flaherty et al. U.S. Pat. No. 3,732,532;
Sato U.S. Pat. No. 3,896,788;
McCarty et al. U.S. Pat. No. 3,901,077;
Groves et al. U.S. Pat. No. 3,922,911;
Djordjevich U.S. Pat. No. 3,996,925;
Aronson U.S. Pat. No. 4,103,679;
Papadofrangakis U.S. Pat. No. 4,217,909;
Papadofrangakis et al. U.S. Pat. No. 4,257,278; and
Papadofrangakis et al. U.S. Pat. No. 4,265,126.

SUMMARY OF THE INVENTION

It is an object of the present invention to provide a method and a device for indicating substantially instantaneously and continuously the extent of the range of frequencies present in a broad band electrical signal.

In accordance with the above object, it is an object to provide such a method and device for giving an indication of the instantaneous frequency distribution of the output of a medical Doppler device, which distribution corresponds to the instantaneous velocity distribution of blood flowing through the vessel being scanned.

More specifically, it is an object to provide a novel method and device for indicating a "band edge" frequency for which the total instantaneous power of all frequency components of the signal being analyzed has a substantially constant proportional relationship to the power of the components having frequencies above—or below—such "band edge" frequency.

Still more specifically, it is an object to provide such a method and device for indicating both an upper band edge frequency and a lower band edge frequency; the power of the frequency components above the upper band edge frequency being a selected minor proportion, such as 12.5%, of the power of all frequency components, and the power of the frequency components below the lower band edge frequency being the same selected minor proportion, such as 12.5%, of the power of all frequency components, so that the power of the frequency components between the two band edge frequencies is a selected major proportion, such as 75%, of the power of all frequency components.

In the preferred embodiment of the invention, the foregoing objects are accomplished by sampling the signal being analyzed at a constant sampling rate to convert the signal to digital form, storing the sample values in memory, and recalling the sample values from memory at a readout rate different from the sampling rate so as to create a frequency-shifted intermediate broadband signal corresponding to the signal being analyzed. The intermediate signal is filtered and the power of the filtered intermediate signal is continuously compared to the power of the unfiltered intermediate signal. The readout rate from memory is adjusted to maintain approximately the same proportionate relationship of the power of the filtered intermediate signal to the power of the unfiltered intermediate signal.

BRIEF DESCRIPTION OF THE DRAWINGS

FIGS. 14, 14A and 15 are detailed circuit diagrams of components of the device of the present invention.

DETAILED DESCRIPTION

Figure 1:
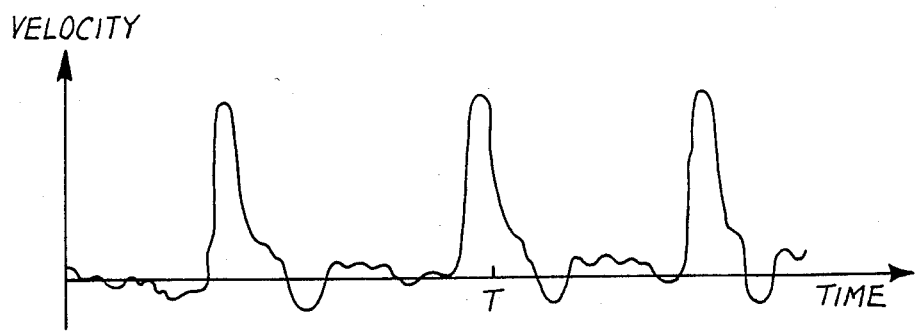
FIG. 1 is a graph illustrating the average blood velocity over time through blood vessel, as might be indicated by the output of a medical Doppler device.

One type of known Doppler output analyzing device generates a trace indicating the average blood velocity over time through the blood vessel being scanned. Such a trace is shown diagrammatically in FIG. 1, the peaks of which correspond to the patient's heartbeats.

Figure 2:
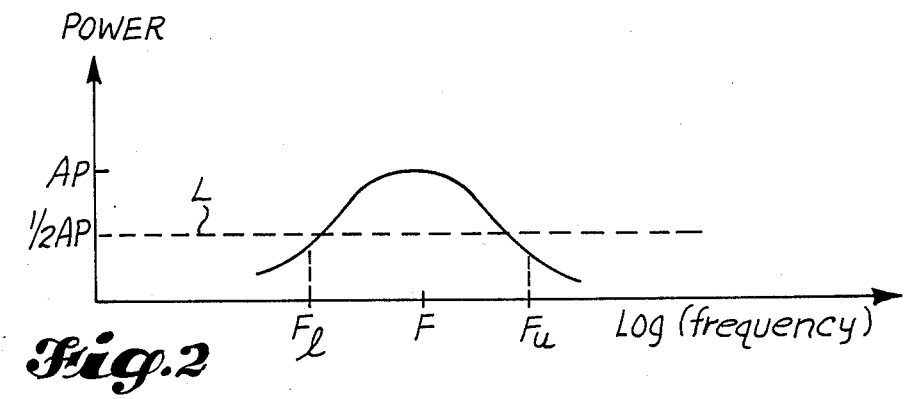
FIG. 2 is a graph illustrating the instantaneous power-frequency distribution of the output of a medical Doppler device.
Figure 3:
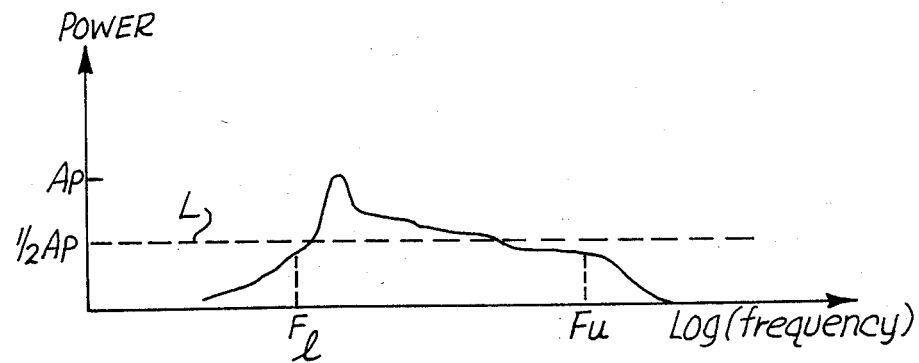
FIG. 3 is a graph illustrating another power-frequency distribution of the output of a medical Doppler device.

At any selected time, such as time T, the Doppler output consists of several components of different frequency and amplitude. For the purpose of illustration, the power-frequency relationship at a given instant is represented in FIG. 2 as a bell-shaped curve centered at frequency F, with the component having frequency F having apparent power AP. It should be noted, however, that particularly for turbulent flow the shape of the power-frequency curve could be irregular such as shown in FIG. 3. Nevertheless, the upper and lower half-power frequencies are the same for the curves of FIGS. 2 and 3 as indicated by the intersections of the broken horizontal lines L with the two curves. Consequently, the bandwidth as measured by calculating the difference between the upper and lower half-power frequencies would not give any indication of the different blood velocity distributions corresponding to the two curves.

Referring to FIGS. 2 and 3, the device of the present invention gives a substantially instantaneous indication of a "lower band edge" frequency $F_l$ and an "upper band edge" frequency $F_u$ for which the following conditions are met: the total power of the components of the Doppler output having frequencies between $F_l$ and $F_u$ equals a selected major proportion of the total power of all frequency components of the Doppler output; and the total power of the Doppler output components having frequencies below $F_l$ is as selected minor proportion of the total power of all frequency components, and is the same as the total power of the Doppler output components having frequencies above $F_u$.

In the preferred embodiment, the device in accordance with the invention is adjusted so that about 75% of the total power of all Doppler output frequency components is from components having frequencies between $F_l$ and $F_u$, with about 12.5% of the total power of all Doppler output frequency components being from components having frequencies below $F_1$, and with about 12.5% of the total power of all Doppler output frequency components being from components having frequencies above $F_u$.

As seen by comparing FIGS. 2 and 3, the substantial high frequency part of the Doppler output represented in FIG. 3 is indicated by the higher value of $F_u$. As noted above, an indication of the half-power bandwidth would not disclose the presence of such a substantial high frequency component.

General Operation

Figure 4:
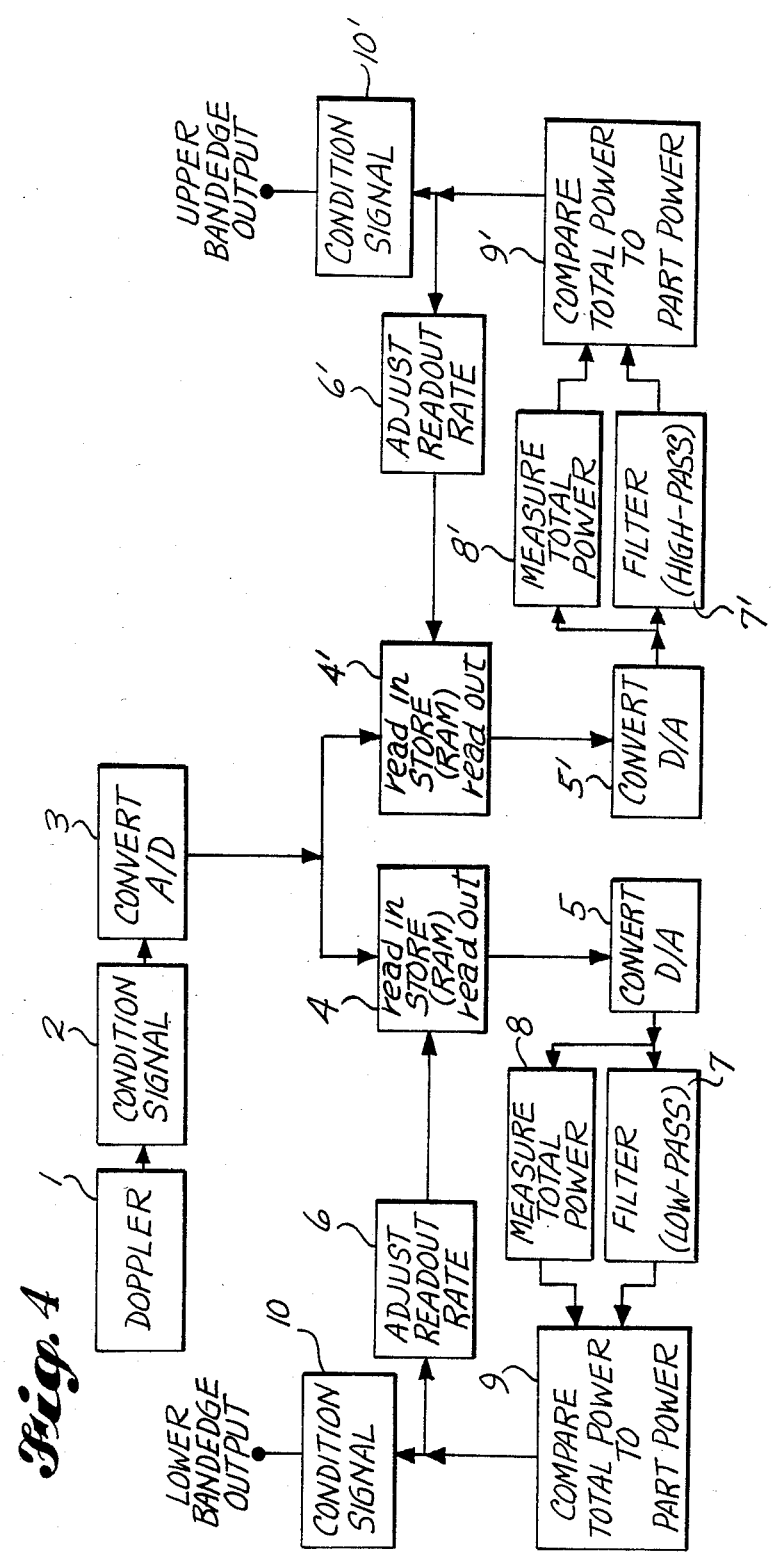
FIG. 4 is a flow chart of the method of the present invention and of the operation of the device of the present invention.

A flow chart of the operation of the device of the present invention is shown in FIG. 4. The broadband, audio frequency, electrical output of the medical Doppler device 1 is conditioned as represented by box 2, primarily by use of a gain control and a low-pass filter, and then is converted from analog to digital form, as represented by box 3, at a constant sampling rate. The digital sample values are stored in each of two random access memory components as represented by the two boxes numbered 4 and 4'.

The digital values stored in the RAMs are consecutively read out of the RAMs and converted back to analog form as represented by boxes 5 and 5'. The rates at which the digital values are read out are adjusted as indicated by boxes 6 and 6' so that the readout rates ae different from the initial sampling rate.

Figure 5:
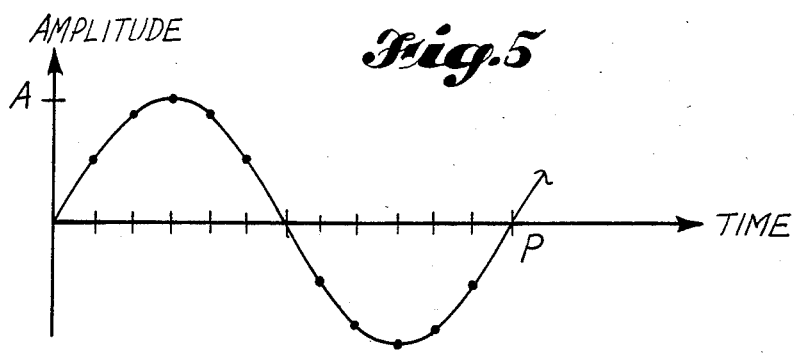
FIG. 5 is a graph illustrating the amplitude over time of one frequency component of the output of a medical Doppler device which, in accordance with the present invention, is sampled at a constant rate for converting such output into digital form.

The effect of reading the digital values out of a RAM at a rate different from the rate that they are written in is illustrated diagrammatically in FIGS. 5 through 9. FIG. 5 shows one frequency component of the Doppler output which is sampled and read into the memory at a constant rate as represented by the uniformly spaced dots on the curve. Such component is represented as a sine wave having a period P, which corresponds to a frequency F, and an amplitude A, which corresponds to apparent power AP.

Figure 6:
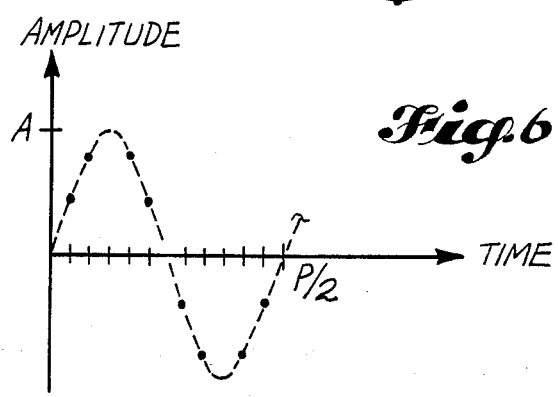
FIG. 6 is a graph illustrating the amplitude over time of the output component of FIG. 5 after such component has been converted to digital form, stored in memory and read out of memory at a rate twice as fast as the sampling rate.

If the digital values are read out from the memory at a rate twice as fast as they are written in, the reconstructed analog curve would be as shown in FIG. 6. The amplitude of each value is, of course, the same as for the curve of FIG. 5, but the period of the reconstructed analog signal has been reduced to one-half the period of the curve of FIG. 5.

Figure 7:
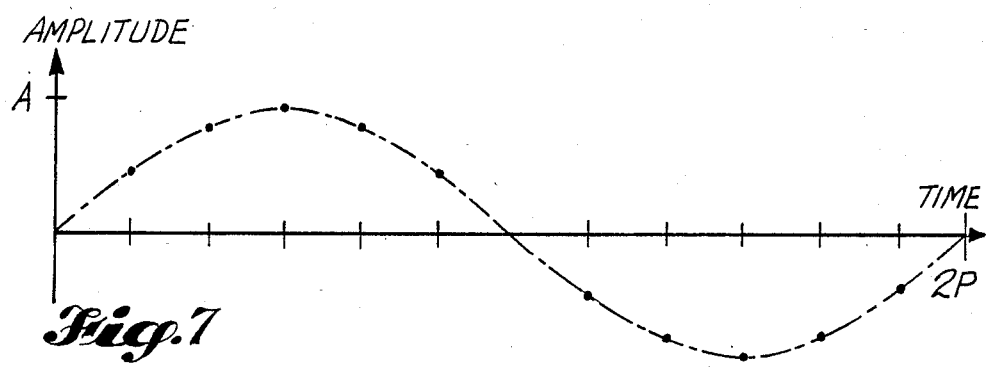
FIG. 7 is a graph illustrating the amplitude over time of the output component of FIG. 5 after it has been converted to digital form, stored in memory and read out of memory at a rate only one-half as fast as the sampling rate.

Similarly, the effect of reading out the digital values from the memory at a rate only one-half as fast as the rate at which they are written in is indicated in FIG. 7. Again, the value of each digital sample does not change but the relative spacing does change so that the period of the reconstructed analog signal is twice the period of the signal that was sampled and written into memory into digital form.

Figure 8:
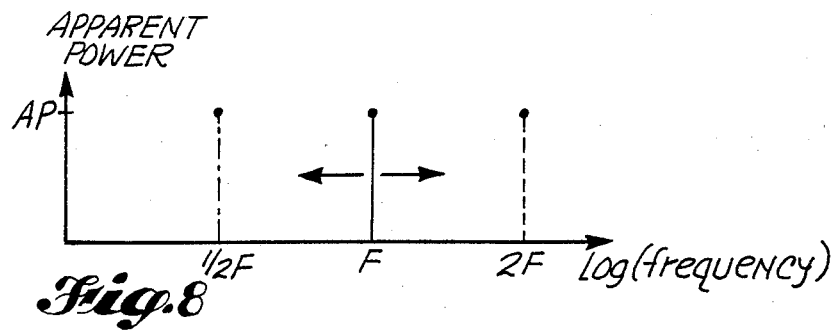
FIG. 8 is a graph illustrating the power-frequency distribution of the signals shown in FIGS. 5, 6 and 7.

Considering only the frequency component shown in FIG. 5, such component can be shown on the power-frequency diagram of FIG. 8 as the solid line pulse at frequency F having apparent power AP. The curve of FIG. 6 is shown by the dash pulse at frequency 2F which also has power AP. On the power-frequency diagram, the effect of reading the digital values out from the RAM at a faster rate than they are written in is to shift the solid line pulse representing the initial output signal component to the right. The curve shown in FIG. 7 can be shown on the power-frequency diagram as the dot-dash pulse at frequency one-half F having power AP. The effect of reading out the digital values from the RAM at a rate slower than they are written in is to shift the solid line pulse on the power-frequency diagram to the left.

Figure 9:
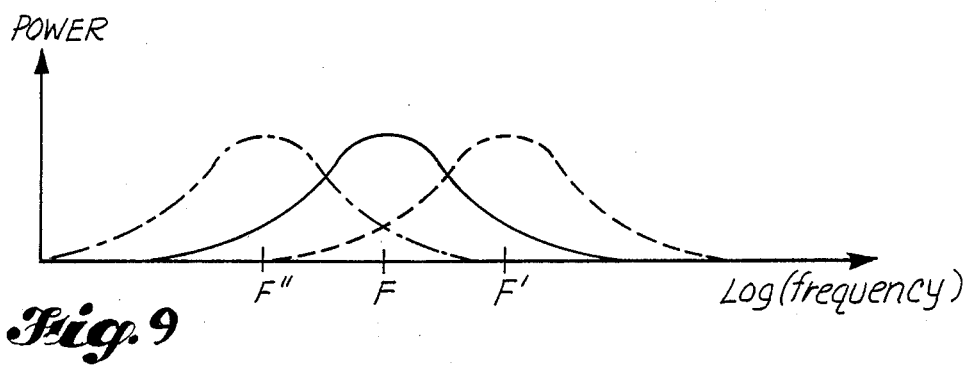
FIGS. 9, 10 and 11 are corresponding graphs illustrating the power-frequency distribution of the output of a medical Doppler device and indicating the effect in a power-frequency diagram of converting the Doppler output to digital form by sampling it at a constant rate, storing the digital values consecutively in memory and reading the values out of memory at a rate different then the sampling rate.

For the entire broadband Doppler output represented, for purposes of illustration, by the bell-shaped power-frequency curve centered at frequency F, the result of changing the readout rate is indicated in FIG. 9. If the readout rate from the RAM is faster than the sampling rate, the effect is to shift the power-frequency curve to the right, as shown in dash lines, so that it is centered at frequency F' which is substantially higher than frequency F. For example, if the readout rate is twice the sampling rate, F' will be F times 2. The effect of using a readout rate slower than the sampling rate is to shift the power-frequency curve to the left, as shown in dot-dash lines, so that the power-frequency curve would be centered over frequency F''. If the readout rate is one-half the sampling rate, F'' will equal F divided by 2.

In each case, the shape of the power-frequency curve remains the same. The relative amplitudes of the frequency components do not change, but the components are shifted either to the left or to the right by the same proportion.

For each frequency component of the Doppler output, the relationship between its original frequency and its new "shifted" frequency is in accordance with the following equations:

$$F_n = F_o \times (R_r/R_s)$$

where:
$F_n$ = the new shifted frequency;
$F_o$ = the original frequency;
$R_r$ = the readout rate; and
$R_s$ = the sampling rate.

As shown in FIG. 4, each reconstructed, frequency-shifted analog signal is filtered as represented by boxes 7 and 7'. Preferably one filter is a low-pass filter and the other a high-pass filter, both having the same cutoff frequency. The effects of the filters are shown in FIGS. 10 and 11.

Curve C shown in FIG. 10 again represents the instantaneous power-frequency distribution of the Doppler output signal which is sampled at a constant rate with the digital values being stored in each of the two RAMs. Curve $C_1$ represents the instantaneous distribution of one of the frequency-shifted signals obtained by reading out the digital values from RAM 4 of FIG. 4 and reconstructing the analog signal. The degree to which the power-frequency curve has been shifted is represented by $S_1$ in FIG. 10. The dot-dash curve LP represents the cutoff characteristics of the low-pass filter. The effect of the low-pass filter is to cut off all of the broadband signal except the portion to the left of curve LP. Such curves intersect at frequency $F_c$ representing essentially the cutoff frequency of filter 7 of FIG. 4. The power of all components of the reconstructed signal after being filtered is represented by the shaded area of FIG. 10.

Figure 10:
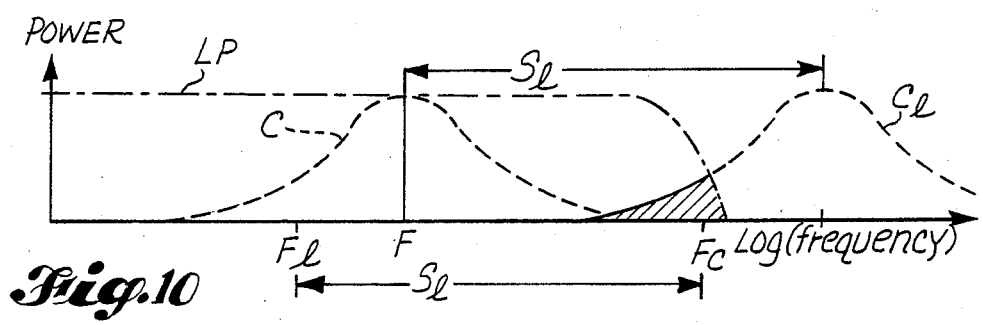

In the device of the present invention, the rate at which the digital values are read out of memory is maintained so that the "partial" power represented by the shaded area of FIG. 10 is the selected minor proportion, such as 12.5%, of the total power of all frequency components. As shown in FIG. 4, this is accomplished by continuously measuring the power of the reconstructed signal before it is filtered, as represented by box 8, comparing such total power with the power of the filtered signal, as represented by box 9, and adjusting the readout rate as required to maintain the same proportionate relationship between them, such as 8:1.

Figure 11:
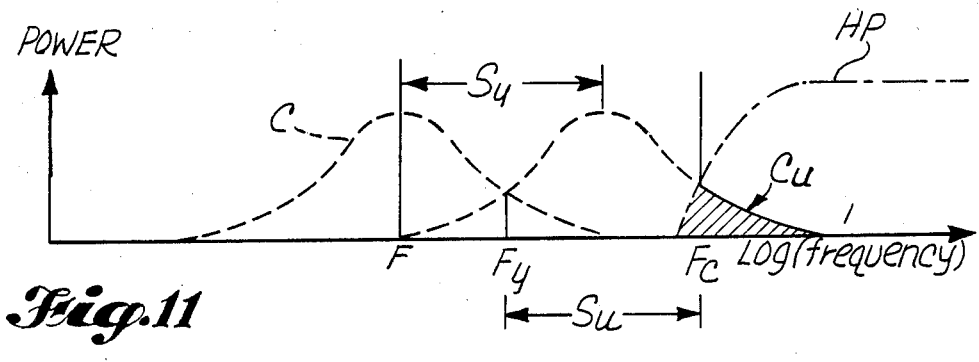

Similarly, as shown in FIG. 11, simultaneously the rate at which the digital values are read out of the other RAM 4' is adjusted, but in this instance the readout rate is maintained so that the power-frequency curve is shifted to the right to a smaller degree as represented $S_u$ in FIG. 11. The high-pass filter represented by box 7' in FIG. 4 and having cutoff characteristics represented by the dot-dash curve HP in FIG. 11 passes the small portion of the reconstructed analog signal to the right of curve HP. The power of that small remaining portion is represented by the shaded area in FIG. 11 and, by adjustment the readout rate, is maintained at the same selected minor proportion of the total power, such as 12.5%, as the power represented by the shaded area in FIG. 10. For example, a 1:8 ratio of the partial power to the total power would be maintained.

In effect, the cutoff frequency $F_c$ is the new shifted frequency for the lower or upper band edge frequency $F_l$ or $F_u$. Such band edge frequency can be determined from the degree to which the corresponding signal must be shifted—represented by $S_l$ or $S_u$—in order to obtain the desired proportionate relationship between the power of the filtered signal and the power of the unfiltered signal; and the degree to which the signal must be shifted is indicated by the readout rate. As represented in FIG. 4 and as described in detail below, the signals generated by the device of the present invention to control the readout rates also are used to generate the band edge-indicating outputs.

Circuit Components

Figure 12:
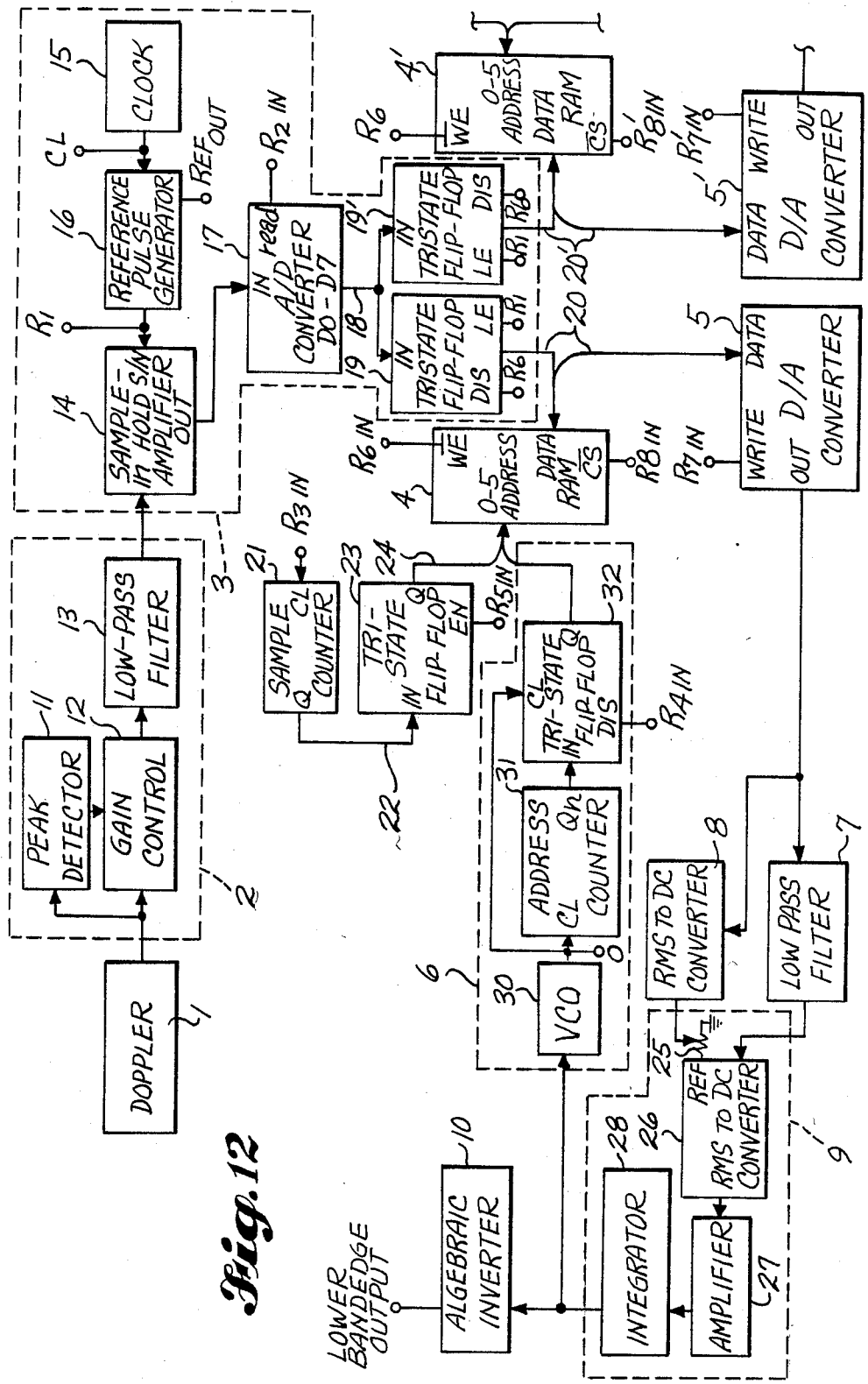
FIG. 12 is a fragmentary block circuit diagram of a device in accordance with the present invention.

As shown in the block circuit diagram of FIG. 12, the signal-conditioning mechanism 2 for the output of the medical Doppler device 1 includes a conventional auto level control, having a peak detector 11 and gain control mechanism 12, and a conventional low-pass filter 13 for reducing the effects of high-frequency noise. In the preferred embodiment, the cutoff frequency of filter 13 is about 15 kHz.

The conventional converter 3 for converting the conditioned Doppler output signal from analog to digital form includes a sample-hold amplifier 14 triggered by a clock 15 through a reference pulse generator 16. Preferably, the frequency of the square wave output of the clock signal CL is about 31.25 kHz and the signal $R_1$ to the sample-hold amplifier is a series of "high" logic pulses synchronized with the clock output, each pulse being of a duration of about 10 microseconds.

The reference pulse generator also provides various other reference or synchronizing pulse outputs for timing the operation of the circuit components, such outputs being identified as pulse signals $R_2$ through $R_8$ and $R_7'$ and $R_8'$.

The output of the sample-hold amplifier 14 serves as the input to a conventional analog to digital converter 17, preferably an 8-bit converter.

Following one path from the converter:

The digital values from such converter are conveyed by way of a data bus 18 to a conventional tristate latch or flip-flop 19 where the values are stored momentarily, after which the values are conveyed by a data bus 20 to the conventional RAM component 4. At about the same time that each sample is collected, a coventional address or sample counter 21 is triggered to increase its count by one unit. An address bus 22 conveys the count to a conventional tristate latch or flip-flop 23 where the count is stored momentarily. An address bus 24 from latch 23 conveys the count to the "address" input of RAM 4 to indicate the address at which the digital value conveyed by the data bus 20 will be stored. Preferably, the count of the sample counter increases one unit from 0 through 63 and then begins again at 0. The digital values from the analog to digital converter are stored consecutively at the corresponding RAM addresses and the latest 64 values always are stored in the RAM.

The digital values are read out of RAM 4 to the digital to analog converter 5, but at a different rate than they are written into the RAM. In the preferred embodiment, the readout rate always is faster than the sampling rate so that each value is read out of the RAM at least once, usually several times. The readout rate is controlled independently of the sampling rate by the rate-adjusting mechanism 6. Should an instant occur when the RAM otherwise would be directed both to store a value at the memory address controlled by the sample counter 21 and to readout a value from the same or a different address, storing a value in the RAM takes priority.

The digital values in the RAM are conveyed to the "data" input of the conventional, preferably 8-bit, digital to analog converter 5 by the bus 20. Such converter reconstructs the Doppler output signal in analog form but with its frequency shifted as discussed above. The reconstructed analog signal is filtered by the conventional low-pass filter 7 which preferably has a cutoff frequency of about 15 kHz.

Simultaneously, the conventional RMS to DC converter 8 converts the reconstructed analog signal and generates a varying voltage which is proportional to the total RMS power. In the preferred embodiment of the invention, the output of converter 8 normally ranges from about 1 volt to about 1.5 volts.

A potentiometer 25 is adjusted to vary the current at the output of converter 8 by a selected proportion. For example, the potentiometer can be adjusted to set the current at the output of converter 8 to provide a reference corresponding to the one-eighth power level. Such output current is applied to the "reference" input of a second conventional RMS to DC converter 26.

Converter 26 measures the power of the reconstructed analog signal after it has been filtered by filter 7 and generates a varying voltage output. The voltage of such output indicates the difference between the power of the filtered reconstructed analog signal before and after being filtered. If the signal to the reference input of converter 26 corresponds to one-eighth of the total power of all frequency components of the reconstructed analog signal, and if filtering the reconstructed signal resulted in cutting off seven-eighths of the total power, the output from converter 26 would be zero.

The output of the second RMS to DC converter is amplified by an amplifier 27. The amplified signal is fed to an integrator 28, the output of which indicates the degree to which the power of the filtered, reconstructed analog signal differs from the selected proportion of the power of the unfiltered signal. For example, in the preferred embodiment the output of the integrator would remain constant so long as the total power of the filtered signal equals 12.5% of the total power of the unfiltered signal, but changes if there is a deviation from that proportionate relationship.

A detailed circuit diagram of components 26, 27 and 28 is shown in FIG. 14 where the reference numbers correspond to the following components in the preferred embodiment of the invention:

26—Analog Devices RMS to DC converter Number AD536;
29—National Semiconductor operational amplifier number LF444.

Returning to FIG. 12, in the preferred embodiment of the invention the output of integrator 28 ranges from 0 to about 6 volts and drives the rate-adjusting mechanism 6. The first component of the rate-adjusting mechanism is a voltage-controlled oscillator 30 which can be the number CD4046 oscillator manufactured by RCA. The output of such oscillator is a square wave of a frequency ranging from 31 kHz to 1.8 Mhz in proportion to the voltage of the input.

Each high pulse of the output of the voltage-controlled oscillator drives a conventional address counter 31 to increase its count by one unit. As for the sample counter 21, such address counter sequences from 0 through 63 and then starts over. Each count is stored momentarily in a conventional tristate flip-flop 32 and, by the bus 24, the address is conveyed to the "address" input of RAM 4 to control the address from which the next digital value will be read out of the RAM to the digital to analog converter 5.

The readout rate from the RAM 4 is equal to the frequency of the output of the voltage-controlled oscillator 30. This frequency is directly proportional to the voltage of the input to the voltage-controlled oscillator, that is, the voltage of the output of integrator 28. Consequently, the voltage of the output of the integrator also indicates the readout rate of the discrete values from memory and the degree to which the reconstructed analog signal has been "frequency shifted" which, in turn, indicates the lower band edge frequency $F_l$ as described and defined above.

In the preferred embodiment of the present invention, the output of integrator 28 is conditioned by an algebraic inverter 10 for which the detailed circuit diagram is shown in FIG. 15 where each amplifier can be a number LF442 operational amplifier manufactured by National Semiconductor. The lower band edge-indicating output ranges in voltage from 0 to about 4 volts and is approximately directly proportional to the lower band edge frequency $F_l$ in accordance with the equation:

$$F_l = 2500 \, V_{out}.$$

For providing an output indicating the upper band edge frequency $F_u$, the loop containing RAM 4' is identical to the loop containing RAM 4 described above, with the exception of the high-pass filter and the connections of the "comparing" RMS to DC converter corresponding to converter 26 shown in FIGS. 12 and 14. In the upper band edge-indicating loop, the first operational amplifier 29 is configured as an inverting amplifier as shown in FIG. 14A, as compared to its configuration as a noninverting amplifier in the lower band edge-indicating loop shown in FIG. 14.

In the upper band edge-indicating loop, the potentiometer is adjusted to set the current at the output of its RMS to DC converter to provide a reference to correspond to one-eighth of the total spectrum power. Consequently, the read-out rate for RAM 4' is maintained at the rate resulting in the total power of the filtered reconstructed analog signal equaling 12.5% of the total power of the unfiltered signal. The voltage of the upper band edge-indicating output is approximately directly proportional to the upper band edge frequency $F_u$ in accordance with the following equation:

$$F_u = 2500 \, V'_{out}.$$

Figure 16:
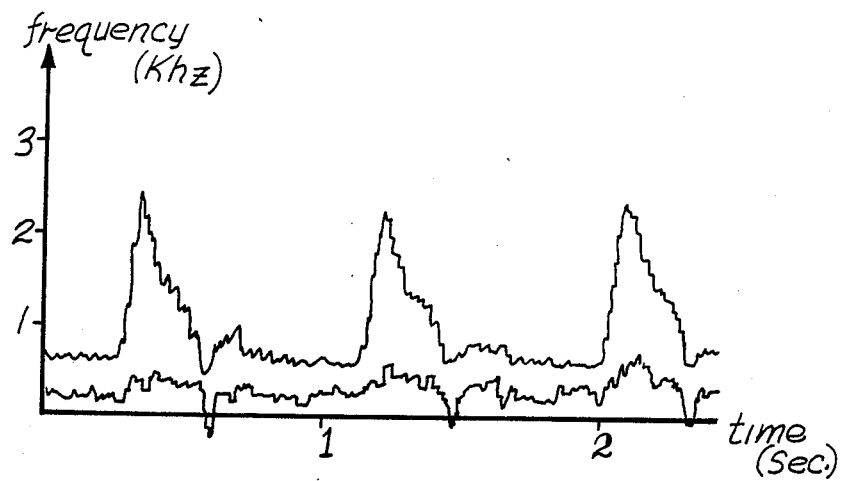
FIG. 16 is a graph illustrating the output of a device in accordance with the present invention.

The band edge-indicating output signals can be displayed conventionally such as on a chart recorder or a cathode-ray tube. A representative display is shown in FIG. 16 where the lower curve or trace indicates the lower band edge frequency and the upper curve or trace indicates the upper band edge frequency. A large vertical distance between the two traces would indicate a wide range of frequencies in the Doppler output which, in turn, may indicate turbulent flow through the blood vessel being scanned, such as might be caused by the blood vessel wall being restricted and roughened from arteriosclerosis.

Reference Pulses

Figure 13:
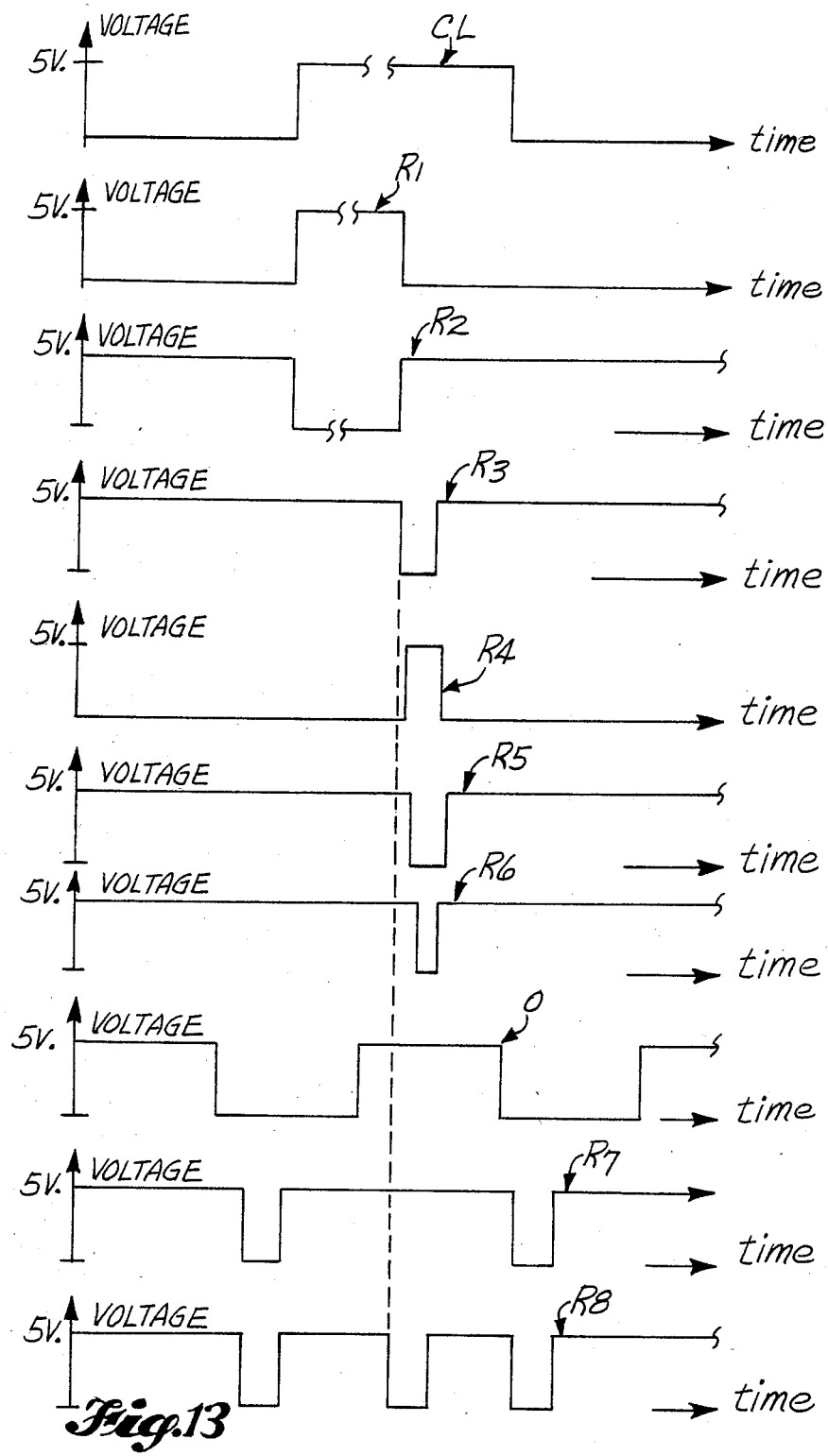
FIG. 13 is a series of corresponding graphs illustrating the voltage over time of various reference or synchronizing pulse signals used in the device of the present invention.

Operation of the device of the present invention can be further explained and summarized with reference to the synchronizing or reference pulses $R_1$ through $R_8$ generated by the reference pulse generator 16 indicated in FIG. 12. The reference pulse signals are shown in FIG. 13 along with the output CL of the clock 15 and the output O of the voltage-controlled oscillator 30.

The clock signal CL is a square wave having a frequency of 31.25 kHz and is "high" for the same period that it is "low".

The reference pulse signal $R_1$ applied to the sample-hold amplifier 14 goes high when the clock signal goes high and is of a duration of about 10 microseconds, which is the period that the sample of the conditioned Doppler output signal is acquired and held.

Reference pulse signal $R_2$ is high when signal $R_1$ is low and is low when signal $R_1$ is high; and is applied to the "read" input of the analog to digital converter 17. The $R_2$ signal controls the analog to digital converter to provide to the bus 18 the previously generated digital value while the next digital value is being generated.

The high pulses of signal $R_1$ also are applied to the "latch enable" inputs of flip-flops 19 and 19' to direct them to store the digital value from the analog to digital converter.

Reference pulse signal $R_3$ consists of low pulses each generated immediately following a pulse of signal $R_2$ and each of a duration of about 250 nanoseconds. Each such pulse is applied to the "clock" input of sample counter 21 to trigger the counter to increase its count by one unit so that the next digital value from the analog to digital converter will be stored in the next address of each RAM.

After a short time delay of about 50 nanoseconds, a high pulse of reference pulse signal $R_4$ is generated, of a duration of about 250 nanoseconds, and such pulse is applied to the "output disable" input of the flip-flops, such as flip-flop 32, which are controlled by the address counters, such as counter 31. Such counters are sequenced by the outputs of the voltage-controlled oscillators. During the duration of each $R_4$ pulse, the outputs of such flip-flops are held in the high impedance state so that no readout addresses are given to the RAMs.

After another short, about 50 nanosecond delay, a low pulse of reference pulse signal $R_5$ is generated, having a duration of about 250 nanoseconds. Such pulse is applied to the "enable" input of flip-flop 23 in which the address from sample counter 21 is stored, so that such address is conveyed to the RAMs to indicate the storage address for the next digital value. Otherwise, the output of flip-flop 23 is held in the high impedance state so as not to interefere with a readout address conveyed to either RAM.

After another short time delay of about 50 nanoseconds, a low pulse of reference pulse signal $R_6$ is generated, having a duration of about 150 nanoseconds, and is applied to the "write" inputs of the RAMs to direct the RAMs to store in the address indicated by flip-flop 23 the digital value then appearing on the buses from flip-flops 19 and 19'. The data flip-flops 19 and 19' also have the $R_6$ signal applied to their respective "disable" inputs so that they provide no data outputs to the RAMs except when the RAMs are directed to store the data.

The short time delays between the pulses of signals $R_3$, $R_4$, $R_5$ and $R_6$ allow the values conveyed to the circuit components to stabilize before they are acted on by the next circuit component. In addition, the time delay between each pulse of signal $R_4$ applied to the disable input of each flip-flop controlled by a voltage-controlled oscillator and the corresponding pulse of signal $R_5$ applied to the enable input of the flip-flop controlled by the sample counter 21 assures that there is no instant during which two addresses are indicated to the RAM at the same time.

The output of the voltage-controlled oscillator 30, indicated as O in FIGS. 12 and 13, is a square wave having a period of 0.5 to 30 microseconds depending on the voltage of the input to such oscillator. Each high pulse of output signal O triggers the address counter 31 to increase its count by one unit. The output of the voltage-controlled oscillator also serves as the "clock" input to its flip-flop 32. If a high pulse of reference pulse signal $R_4$ is not being applied to the disable input of flip-flop 32—which would indicate that a new digital value is being written into RAM 4—then the readout address from counter 31 is conveyed to such RAM.

The pulses of reference pulse signal $R_7$ are synchronized with the square wave output O of the voltage-controlled oscillator 30. Each low pulse of signal $R_7$ begins about 100 nanoseconds after the output of such oscillator goes low and lasts for about 250 nanoseconds.

The pulses of signal $R_7$ are applied to the "write" input of the corresponding digital to analog converter 5 to trigger such converter to receive the digital value on bus 20 which is from the readout address indicated to the RAM by flip-flop 32.

A final reference pulse signal $R_8$ is applied to the "chip select" input of RAM 4. Such signal is a composite of signals $R_3$ and $R_7$ and is the output of an OR gate having signal $R_3$ and $R_7$ as its inputs. During the time that the $R_8$ reference pulse signal is high, the RAM is not operable to write or read information and draws little power. The low pulses of signal $R_8$, however, direct the RAM to "wake up" for the time required to write information from flip-flop 19 or read information to the digital to analog converter 5.

For the upper band edge-indicating loop having RAM 4', the operation of the pulse reference signals synchronized with the clock signal CL is the same as described above, that is, signals $R_1$ through $R_6$. The output of the voltage-controlled oscillator of such loop, however, almost always will be of a different frequency than that of oscillator 30, so that two additional reference pulse signals are generated, one corresponding to signal $R_7$ and the other corresponding to signal $R_8$, but each synchronized with the output of the oscillator controlling the readout rate for RAM 4'.

Modifications

As described above, in the preferred embodiment of the present invention the power of the reconstructed analog signal is measured and compared to the power of such signal after being filtered. In an alternative embodiment, the total power of the Doppler output signal after being conditioned could be compared with the power of the filtered reconstructed analog signal. For example, in FIG. 4 the power of the Doppler output could be measured following box 2 and serve as the upper "input" to boxes 9 and 9'.

Also, the device in accordance with the present invention can, of course, be adjusted to indicate upper and lower band edge frequencies between which a different preselected proportion of the power resides; or a single frequency-shifting loop could indicate, for example, a central or midpower frequency above and below which 50% of the power resides; or additional frequency-shifting loops could be used to indicate, for example, the one-quarter, one-half and three-quarter power frequencies in addition to the one-eighth and seven-eighths power frequencies.

I claim:

1. In a method for giving an indication of the frequency distribution of an analog, broadband, electrical input signal, the steps of:
    sampling the input signal at a constant sampling rate and generating a series of discrete values representing the analog input signal in digital form;
    storing the discrete values in memory;
    reading out the discrete values from memory at a readout rate independent from the sampling rate and using the values read out of memory to construct a new, intermediate analog signal;
    measuring the power $P_a$ of one of the analog signals;
    filtering the intermediate signal by passing only selected frequency components of such signal;
    measuring the power $P_b$ of the filtered intermediate signal;
    comparing powers $P_a$ and $P_b$; and
    adjusting the readout rate of the discrete values from memory to maintain a preselected proportionate relationship between the power $P_a$ and power $P_b$.

2. In the method defined in claim 1, generating an output signal indicative of the readout rate of the discrete values from memory.

3. In the method defined in claim 2, substantially continuously generating an output signal indicative of the existing readout rate of the discrete values from memory.

4. In the method defined in claim 1, filtering the intermediate signal by passing only the components of such signal having frequencies above a substantially constant cutoff frequency.

5. In the method defined in claim 1, filtering the intermediate signal by passing only the components of such signal having frequencies below a substantially constant cutoff frequency.

6. In the method defined in claim 1, sequencing an address counter after generation of each discrete value but before generation of the next discrete value and using the address counter to control the memory address at which such generated discrete value will be stored so that the discrete values are stored in consecutive memory addresses; and generating a signal indicative of the difference between power $P_a$ and power $P_b$, using such signal to control the frequency of the output of an oscillator, and using the oscillator output to sequence an address counter controlling the memory address from which the next discrete value will be read out of memory.

7. In the method defined in claim 6, maintaining the readout rate faster than the sampling rate so that each digital value will be read out of memory at least once.

8. In the method defined in claim 1, adjusting the readout rate of the discrete values from memory such that power $P_b$ is a substantially constant minor proportion of power $P_a$.

9. In the method defined in claim 1, constructing the new, intermediate analog signal using the values read out of memory such that each frequency component of the analog input signal is shifted to a new frequency $F_n$ in accordance with the following equation:

$$F_n = F_o(R_r/R_s)$$

where:
  $F_o$ = the frequency of such component of the analog input signal;
  $R_s$ = the constant rate at which the input signal is sampled; and
  $R_r$ = the rate at which the discrete values representing the input signal in digital form are read out of the memory.

10. A method for indicating the bandwidth of an analog, broadband, electrical input signal which comprises substantially continuously and instantaneously indicating an upper band edge frequency $F_u$ and a lower band edge frequency $F_l$ for which the following conditions are met regardless of irregularity in amplitude of the frequency components of such signal:
    the power of the components of the input signal having frequencies between $F_l$ and $R_u$ equals a predetermined, substantially constant, major portion of the aggregate power of all frequency components of such input signal; and
    the power of the components of such input signal having frequencies below $F_l$ is a predetermined, substantially constant, minor proportion of the aggregate power of all frequency components of such input signal; and the power of the components of such input signal having frequencies above $F_u$ is a predetermined, substantially constant, minor proportion of the aggregate power of all frequency components of such input signal.

11. In a device for giving an indication of the frequency distribution of a broadband electrical input signal including several frequency components:

digital converter means for sampling the input signal at a constant sampling rate and for generating a series of discrete values representing the input signal in digital form;

memory means for storing the discrete values;

frequency-shifting means controlling readout of the discrete values from the memory means at a readout rate faster than the sampling rate and for using the digital values to construct an intermediate signal corresponding to the input signal but with the frequency $F_o$ of each component of the input signal shifted to a new frequency $F_n$ in accordance with the following equation:

$$F_n = F_o(R_r/R_s)$$

where:
$F_o$ = the frequency of such component of the analog input signal;
$R_s$ = the rate at which the input signal is sampled; and
$R_r$ = the rate at which the discrete values representing the input signal in digital form are read out of the memory;

digital to analog converter means for converting such intermediate signal to analog form;

cutoff filter means having a substantially constant cutoff frequency for passing components of the intermediate analog signal having frequencies at one side of the cutoff frequency and for cutting off components of such intermediate signal having frequencies at the other side of the cutoff frequency such that the power of the filtered intermediate signal is less than the power of the unfiltered signal and the ratio between such powers is a function of the readout rate;

means for measuring the power of the intermediate signal before and after it is filtered and for adjusting the readout rate as required to maintain approximately a preselected proportionate relationship between the power of the filtered intermediate signal and the power of the unfiltered intermediate signal.

12. In the device defined in claim 11, means for generating an output signal indicative of the readout rate to indicate the degree to which the frequency of the input signal has been shifted by the frequency-shifting means and to give an indication of the frequency above and below which the preselected proportionate power relationship applies with respect to the input signal.

13. In a device for analyzing the velocity distribution of blood flowing through a blood vessel:

medical Doppler means for scanning a blood vessel and for generating a Doppler output signal having a frequency distribution corresponding to a blood velocity distribution;

analog to digital converter means for sampling the Doppler output signal at a substantially constant rate and for generating a series of discrete values representing the Doppler output signal in digital form;

a random access memory component;

first address means controlling said random access memory component to store the digital values at selected memory addresses;

second address means controlling said random access memory component to read out the digital values from the selected memory addresses;

voltage-controlled oscillator means having an input and an output, providing an output signal of a frequency determined by the voltage at said input and controlling said second address means to direct said random access memory component to read out the digital values at a rate equal to the frequency of the output signal of said voltage-controlled oscillator means;

digital to analog converter means for using the digital values read out of said random access memory component to generate an intermediate analog signal;

first power-measuring means for generating a first signal indicating a preselected proportion of the power of the intermediate analog signal;

cutoff filter means having a substantially constant cutoff frequency for passing frequency components of the intermediate signal having frequencies at the same side of such cutoff frequency and for cutting off frequency components of the intermediate signal having frequencies at the other side of such cutoff frequency such that the power $P_a$ of the intermediate signal after being filtered by said cutoff filter means is less than the power $P_b$ of the intermediate signal before being filtered and such that the ratio $P_a:P_b$ is a function of the readout rate of digital values from said random access memory component which, in turn, is the same as the frequency of the output signal of said voltage-controlled oscillator means and a function of the voltage at said input of said voltage-controlled oscillator means;

second power-measuring means for generating a second signal indicating the difference between the power indicated by said first signal and the power of the components of the intermediate signal passed by said cutoff filter means;

means for converting said second signal to a third, varying voltage signal and for providing said third signal to the input of said voltage-controlled oscillator means such that the frequency of the voltage-controlled oscillator means is adjusted to maintain the ratio $P_a:P_b$ at a selected approximately constant ratio; and means providing a band edge output signal indicative of the frequency of the output signal of said voltage-controlled oscillator means to give an indication of the frequency of which the approximately constant ratio $P_a:P_b$ applies with respect to the Doppler output.

14. In a method for giving an indication of the velocity distribution of blood flowing through a blood vessel, the steps of;

scanning a blood vessel with a medical Doppler device to generate an analog, broadband, Doppler output signal having a frequency distribution corresponding to a blood velocity distribution;

sampling the Doppler output signal at a constant sampling rate and generating a series of discrete values representing the Doppler output signal in digital form;

storing the discrete values in memory;

reading out the discrete values from memory at a readout rate independent from the sampling rate and using the values read out of memory to construct a new, intermediate analog signal;

measuring the power $P_a$ of one of the analog signals;

filtering the intermediate signal by passing only selected frequency components of such signal;

measuring the power $P_b$ of the filtered intermediate signal;

comparing such powers $P_a$ and $P_b$;

adjusting the readout rate of the discrete values to maintain a preselected proportionate relationship between power $P_a$ and power; and generating a signal indicative of the readout rate of the discrete values from memory.

15. In a device for giving an indication of the velocity distribution of blood flowing through a blood vessel:

medical Doppler means for scanning a blood vessel and for generating a Doppler output signal having a frequency distribution corresponding to a blood velocity distribution;

digital converter means for sampling the Doppler output signal at a constant sampling rate and for generating a series of discrete values representing the Doppler output signal in digital form;

memory means for storing the discrete values;

frequency-shifting means controlling readout of the discrete values from the memory means at a readout rate faster than the sampling rate and for using the digital values to construct an intermediate signal corresponding to the Doppler output signal but with the frequency $F_o$ of each component of the Doppler output signal shifted to a new frequency $F_n$ in accordance with the following equation:

$$F_n = F_o(R_r/R_s)$$

where:

$F_o$ = the frequency of such component of the Doppler output signal;

$R_s$ = the rate at which the Doppler output signal is sampled; and $R_r$ = the rate at which the discrete values representing the Doppler output signal in digital form are read out of the memory;

digital to analog converter means for converting such intermediate signal to analog form;

cutoff filter means having a substantially constant cutoff frequency for passing components of the intermediate analog signal having frequencies at one side of the cutoff frequency and for cutting off components of such intermediate signal having frequencies at the other side of the cutoff frequency such that the power of the filtered intermediate signal is less than the power of the unfiltered signal and the ratio between such powers is a function of the readout rate;

means for measuring the power of the intermediate signal before and after it is filtered and for adjusting the readout rate as required to maintain approximately a preselected proportionate relationship between the power of the filtered intermediate signal and the power of the unfiltered intermediate signal; and means for generating an output signal indicative of the readout rate to indicate the degree to which the frequency of the Doppler output signal has been shifted by the frequency-shifting means and to give an indication of the frequency above and below which the preselected proportionate power relationship applies with respect to the Doppler output signal.

16. In a device for analyzing an analog, broadband, electrical input signal including several frequency components:

analog to digital converter means for sampling the input signal at a substantially constant rate and for generating a series of discrete values representing the input signal in digital form;

a random access memory component;

first address means controlling said random access memory component to store the digital values at selected memory addresses;

second address means controlling said random access memory component to read out the digital values from the selected memory addresses;

voltage-controlled oscillator means having an input and an output, providing an output signal of a frequency determined by the voltage at said input and controlling said second address means to direct said random access memory component to read out the digital values at a rate equal to the frequency of the output signal of said voltage-controlled oscillator means;

digital to analog converter means for using the digital values read out of said random access memory component to generate an intermediate analog signal;

first power-measuring means for generating a first signal indicating a preselected proportion of the power of the intermediate analog signal;

cutoff filter means having a substantially constant cutoff frequency for passing frequency components of the intermediate signal having frequencies at the same side of such cutoff frequency and for cutting off frequency components of the intermediate signal having frequencies at the other side of such cutoff frequency such that the power $P_a$ of the intermediate signal after being filtered by said cutoff filter means is less than the power $P_b$ of the intermediate signal before being filtered and such that the ratio $P_a:P_b$ is a function of the readout rate of digital values from said random access memory component which, in turn, is the same as the frequency of the output signal of said voltage-controlled oscillator means and a function of the voltage at said input of said voltage-controlled oscillator means;

second power-measuring means for generating a second signal indicating the difference between the power indicated by said first signal and the power of the components of the intermediate signal passed by said cutoff filter means;

means for converting said signal to a third, varying voltage signal and for providing said third signal to the input of said voltage controlled-controlled oscillator means such that the frequency of the voltage-controlled oscillator means is adjusted to maintain the ratio $P_a:P_b$ at a selected approximately constant ratio; and means providing a band edge output signal indicative of the frequency of the output signal of said voltage-controlled oscillator means to give an indication of the frequency for which the approximately constant ratio $P_a:P_b$ applies with respect to the input signal.

17. In a method for giving an indication of the frequency distribution of an electrical input signal, the steps of:
   generating an intermediate electrical signal corresponding to the input signal but with the frequency of each component of such intermediate signal shifted as compared to the frequency of the corresponding component of the input signal;
   measuring the power $P_a$ of one of the signals;
   filtering the intermediate signal by passing only selected frequencies of such signal;
   measuring the power $P_b$ of the filtered intermediate signal;
   comparing such powers $P_a$ and $P_b$; and
   generating an output signal indicative of the difference between such powers $P_a$ and $P_b$ so as to indicate the extent to which frequency components cutoff by filtering the intermediate signal contributed to the total power before filtering.

18. In the method defined in claim 17, generating the intermediate electrical signal by shifting the frequency of each component of the input signal at any instant by the same proportion as the shifting of the frequency of each other component of the input signal.

19. In the method defined in claim 17, adjusting the degree of shifting of each component of the input signal so as to maintain the ratio $P_a:P_b$ at a selected approximately constant ratio.

20. In the method defined in claim 19, filtering the intermediate signal by passing only the components of such signal at the same side of a substantially constant cutoff frequency, and generating a signal indicating the frequency above and below which the predetermined ratio $P_a:P_b$ applies with respect to the input signal.

* * * * *